US008280924B2

(12) United States Patent
Olenick et al.

(10) Patent No.: US 8,280,924 B2
(45) Date of Patent: Oct. 2, 2012

(54) OBJECT-RELATIONAL MAPPING WITH DYNAMIC RELATIONAL SCHEMAS

(75) Inventors: Brad Mark Olenick, Redmond, WA (US); Gregory Lawrence Hughes, Redmond, WA (US); Siddharth Jayadevan, Seattle, WA (US); Carll Bennett Hoffman, Mercer Island, WA (US); Clemens Kerer, Vienna (AT)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/412,135

(22) Filed: Mar. 26, 2009

(65) Prior Publication Data

US 2010/0250625 A1  Sep. 30, 2010

(51) Int. Cl.
*G06F 7/00* (2006.01)
*G06F 17/30* (2006.01)

(52) U.S. Cl. .......................................... 707/807; 707/810
(58) Field of Classification Search .................. 707/917, 707/802, 809, 810
See application file for complete search history.

(56) References Cited

U.S. PATENT DOCUMENTS

| | | | | | |
|---|---|---|---|---|---|
| 6,163,776 | A | * | 12/2000 | Periwal | 707/999.006 |
| 6,385,618 | B1 | * | 5/2002 | Ng et al. | 707/999.103 |
| 6,460,043 | B1 | * | 10/2002 | Tabbara et al. | 707/999.003 |
| 6,618,732 | B1 | * | 9/2003 | White et al. | 707/769 |
| 7,149,730 | B2 | * | 12/2006 | Mullins et al. | 707/999.002 |
| 7,313,561 | B2 | * | 12/2007 | Lo et al. | 707/999.102 |
| 7,624,403 | B2 | * | 11/2009 | Ishimitsu et al. | 719/328 |
| 7,680,767 | B2 | * | 3/2010 | Adya et al. | 707/999.002 |
| 7,702,695 | B2 | * | 4/2010 | Mehra et al. | 707/802 |
| 2007/0027906 | A1 | | 2/2007 | Meijer | |
| 2008/0228697 | A1 | | 9/2008 | Adya | |
| 2009/0024652 | A1 | | 1/2009 | Thompson | |
| 2010/0185593 | A1 | * | 7/2010 | Wong et al. | 707/684 |

OTHER PUBLICATIONS

Clint Michael Frederickson "Object Mapping With Java Annotations"; Apr. 2005; Published by Montana State University as Master's thesis; pp. 1-47.*
Jeffrey M. Barnes "Object-Relational Mapping as a Persistence Mechanism for Object-Oriented Applications"; Apr. 28, 2007; Published by Macalester College as Honors Project; pp. 1-113.*
Sneed, Anthony; "Flexible Data Access with LINQ to SQL and the Entity Framework"; 2009; pp. 1-13; http://msdn.microsoft.com/en-us/magazine/dd263098.aspx.
Adya, Atul; "Anatomy of the ADO.NET Entity Framework"; 2007; pp. 877-888; http://delivery.acm.org/10.1145/1250000/1247580/p877-adya.pdf?key1=1247580&key2=6766123321&coll=GUIDE&dl=GUIDE&CFID=20123362&CFTOKEN=89315035.
Telerik; "Telerik OpenAccess ORM Features"; 2008-2009; pp. 1-7; http://www.telerik.com/products/orm/features.aspx.

(Continued)

*Primary Examiner* — James Trujillo
*Assistant Examiner* — Pavan Mamillapalli
(74) *Attorney, Agent, or Firm* — Workman Nydegger

(57) ABSTRACT

In an embodiment, a generic database application of a computer system receives a portion of input data from a database. The generic database application can communicate with the database using a variety of different database schemas. The generic database application of the computer system infers a portion of ORM metadata associated with the received input data. The computer system accesses a generic ORM query where the ORM query is configured to provide mapping information to map the input data into a graph of objects according to the database object properties included in the ORM metadata. The computer system maps the input data into a graph of objects using the database object properties included in the ORM metadata and displays an ORM object view which includes the graph of objects.

20 Claims, 4 Drawing Sheets

OTHER PUBLICATIONS

Oracle; "Oracle TopLink 11g (11.1.1.0.0)"; Sep. 2008; pp. 1-4; http://www.oracle.com/echnology/products/ias/toplink/technical/t11g_fov.htm.

Karega, Scott; "ADO.NET Entity Framework"; Jul. 29, 2008; pp. 1-2; http://www.pathf.com/blogs/tag/object-relation-mapping-orm/.

* cited by examiner

400

| A Database Software Application Receives A Query From A User, Wherein The Database Software Application Is Configured To Identify Relational Database Schema Changes As Provided In Portions Of Object-Relational Mapping (ORM) Metadata | — 410 |

↓

| The Database Software Application Receives One Or More Portions Of (ORM) Metadata Associated With The Database Object, The ORM Metadata Including An Indication Of Object Properties And Database Schema Changes Associated With The Database Object | — 420 |

↓

| The Database Software Application Dynamically Parsing The Received Query To Perform Type-Checking On The Query | — 430 |

↓

| Based On The Dynamic Parsing, Provide Substantially Instantaneous Feedback Regarding The Compatibility Of The Received Query | — 440 |

FIG. 4

OBJECT-RELATIONAL MAPPING WITH DYNAMIC RELATIONAL SCHEMAS

BACKGROUND

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

It is common for many computerized tasks to utilize data from multiple different sources. Unfortunately, data from different sources presents itself according to widely varying data models (structural constraints, schema/type systems, absence or presence of associated behaviors, update semantics, etc.). Thus, to draw on data from different sources, operate on synthesized data obtained from the different sources, react to updates to data from the different sources, and propagate change requests to the data at the different sources, applications are typically configured to interoperate with a variety of different data types and data formats.

However, using various different data types and different data formats native to different applications can make the joining together of data from different applications, for example, into a data type and data format native to yet another application, difficult. Often, this results in software applications that are designed to work only with a specific type of data, data format or schema.

For instance, database applications designed to interact with an information database may differ in their capabilities. Specific database applications are generally designed to interact with databases using some type of fixed schema. Specific database applications can use object-relational mapping (ORM) and strong-typing when accessing information stored in the relational database. When changes are made to the schema used by the specific database application, however, the application has to be restarted, updated, recompiled and redeployed in order to implement the changes. On the flipside, generic database applications are not designed to use a particular schema when interacting with the relational database. Rather, generic applications can use a variety of different schemas to access information, as generic database applications are typically developed without a specific awareness of a given schema. As such, generic database applications typically do not implement or make use of strong-typed ORM technologies to access information stored in the relational database.

BRIEF SUMMARY

Embodiments described herein are directed to mapping relational input data into a graph of objects using object-relational mapping (ORM) metadata. In one embodiment, a generic database application of a computer system receives a portion of input data from a database. The generic database application is configured to communicate with the database using at least one of a variety of different database schemas. The generic database application of the computer system infers a portion of ORM metadata from the at least one database schema, where the ORM metadata is associated with the received input data, and where the ORM metadata includes an indication of database object properties and database schema settings associated with the database objects. The computer system accesses a generic ORM query, where the ORM query is configured to provide mapping information to map the input data into a graph of objects according to the database object properties included in the ORM metadata. The computer system maps the input data into a graph of objects, as indicated in the accessed ORM query, using the database object properties included in the ORM metadata and displays an ORM object view which includes the graph of objects, where the object view represents at least a portion of the input data in an appropriate manner as indicated in the received ORM metadata.

Other embodiments are directed to providing dynamic strongly-typed object querying in a database software application. In one embodiment, a database software application of a computer system receives a query from a user, where the database software application is configured to identify relational database schema changes as provided in portions of object-relational mapping (ORM) metadata. The database software application of the computer system receives portions of (ORM) metadata associated with the database object, where the ORM metadata includes an indication of object properties and database schema changes associated with the database object. The database software application of the computer system dynamically parses the received query to perform type-checking on the query. The computer system also, based on the dynamic parsing, provides substantially instantaneous feedback regarding the compatibility of the received query. Additionally or alternatively, the compatibility of a received query may be reconfirmed in cases where the database software application of the computer system receives an indication of database schema changes which affect a previously confirmed query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates a flowchart of an example method for providing dynamic strongly-typed object querying in a database software application.

DETAILED DESCRIPTION

Figure 1:
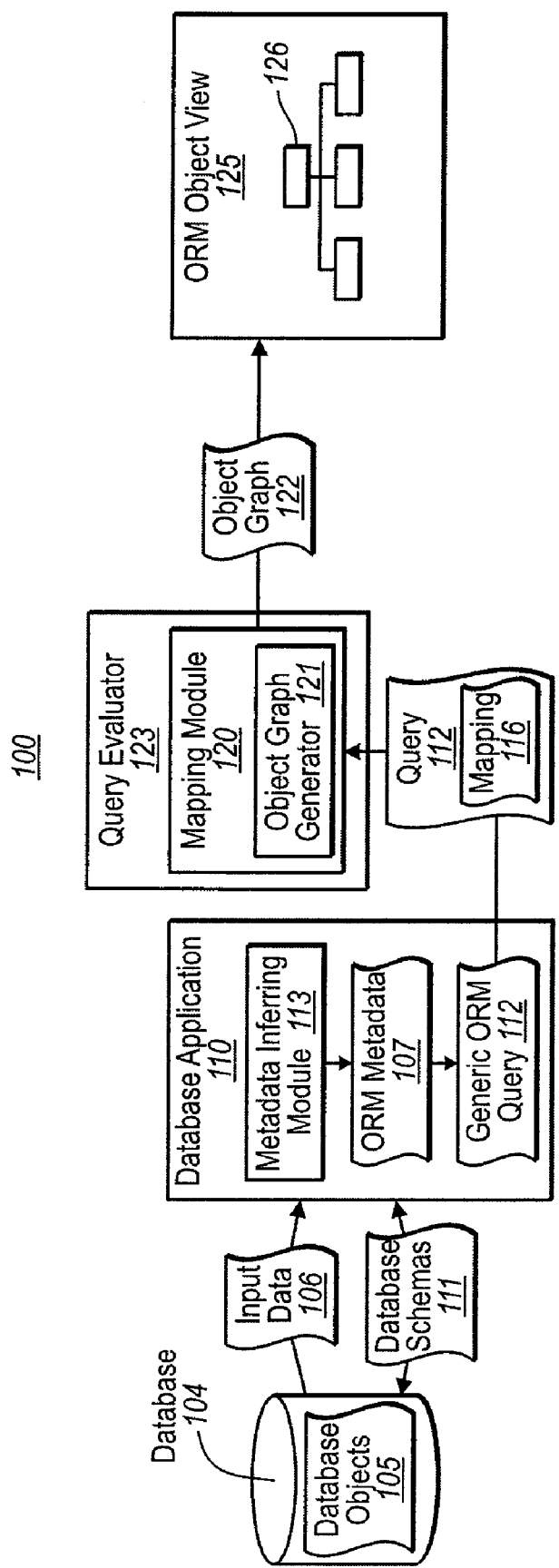
FIG. 1 illustrates a computer architecture in which embodiments of the present invention may operate including mapping relational input data into a graph of objects using object-relational mapping (ORM) metadata.

Embodiments described herein are directed to mapping relational input data into a graph of objects using object-relational mapping (ORM) metadata. In one embodiment, a generic database application of a computer system receives a portion of input data from a database. The generic database application is configured to communicate with the database using at least one of a variety of different database schemas. The generic database application of the computer system infers a portion of ORM metadata from the at least one database schema, where the ORM metadata is associated with the received input data, and where the ORM metadata includes an indication of database object properties and database schema settings associated with the database objects. The computer system accesses a generic ORM query, where the ORM query is configured to provide mapping information to map the input data into a graph of objects according to the database object properties included in the ORM metadata. The computer system maps the input data into a graph of objects, as indicated in the accessed ORM query, using the database object properties included in the ORM metadata and displays an ORM object view which includes the graph of objects, where the object view represents at least a portion of the input data in an appropriate manner as indicated in the received ORM metadata.

Other embodiments are directed to providing dynamic strongly-typed object querying in a database software application. In one embodiment, a database software application of a computer system receives a query from a user, where the database software application is configured to identify relational database schema changes as provided in portions of object-relational mapping (ORM) metadata. The database software application of the computer system the database software application receives portions of (ORM) metadata associated with the database object, where the ORM metadata includes an indication of object properties and database schema changes associated with the database object. The database software application of the computer system dynamically parses the received query to perform type-checking on the query. The computer system also, based on the dynamic parsing, provides substantially instantaneous feedback regarding the compatibility of the received query. Additionally or alternatively, the compatibility of a received query may be reconfirmed in cases where the database software application of the computer system receives an indication of database schema changes which affect a previously confirmed query Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes database application 110. Database application 110 may include any type of database system configured to store information. The database may comprise a single computer system or multiple different systems. For example, database application 110 may be run on multiple different computer systems simultaneously, with each computer system being configured to communicate with the other computer systems via a computer network such as a local area network (LAN) or the internet. In some embodiments, database application 110 may be configured to interact with a relational database. As used herein, two general types of database applications are referred to: specific database applications and generic database applications.

In some embodiments, database application 110 may be a generic database application. Accordingly, database application 110 (or "application 110") may use one or more of database schemas 111 to communicate with a relational database (e.g. database 104). Such communications may include database 104 sending input data 106 to database application 110 for eventual display on a user interface. For instance, a user may be using an application that displays information supplied by a database. Thus, in some cases, input data 106 sent from database 104 to database application 110 may include information that was requested by a user. Metadata inferring module 113 of database application 110 may be configured to infer ORM metadata 107 from one or more of database schemas 111. ORM metadata may include an indication of database object properties and database schema settings associated with the database objects (e.g. 105). This ORM metadata may allow a generic database application to implement ORM capabilities to retrieve and access information from database 104.

Database application 110 also includes (or has access to) generic ORM query 112. Generic ORM query 112 may be configured to use object-relational mapping information to map input data 106 into a graph of objects (e.g. object graph 122). The generic query 112 may be sent, along with mapping information 116 to mapping module 120 of query evaluator 123 which includes object graph generator 121. Mapping module may be configured to map input data 106 into object graph 122 as indicated in the generic query using the database object properties included in the ORM metadata. The resulting object graph 122 may be sent to an application or other user interface for display as ORM object view 125 with the actual data objects (or representations thereof) being displayed as objects 126. Although shown in a hierarchical tree form in 126, the data portions shown in ORM object view 125 may be in substantially any form including lists, workflows, charts, web pages or other methods of presenting database information to a user. These concepts will be explained in greater detail below with regard to method 200 of FIG. 2.

Figure 2:
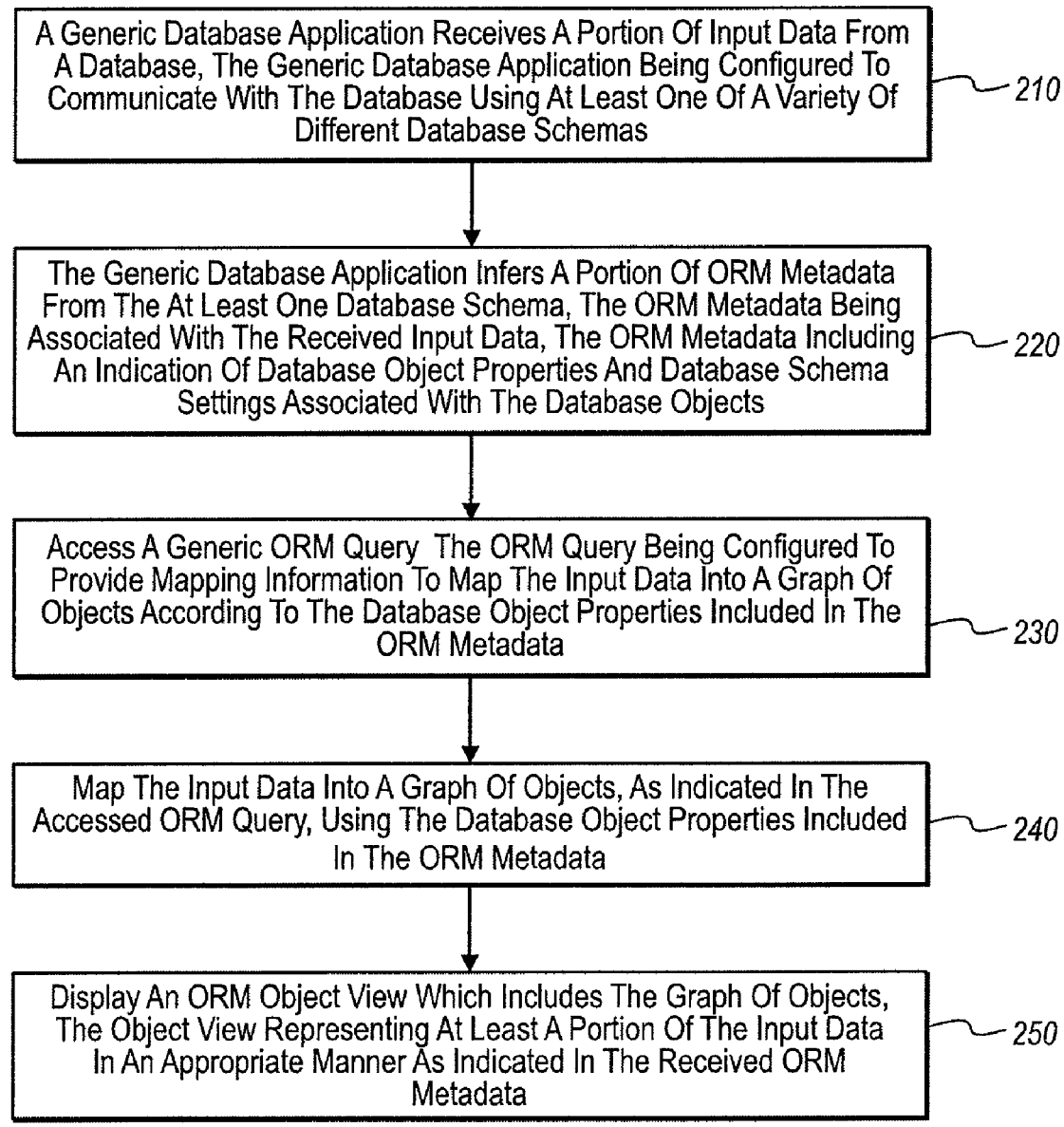
FIG. 2 illustrates a flowchart of an example method for mapping relational input data into a graph of objects using object-relational mapping (ORM) metadata.

FIG. 2 illustrates a flowchart of a method 200 for mapping relational input data into a graph of objects using object-relational mapping (ORM) metadata. The method 200 will now be described with frequent reference to the components and data of environment 100.

Method 200 includes an act of a generic database application receiving a portion of input data from a database, the generic database application being configured to communicate with the database using at least one of a variety of different database schemas (act 210). For example, database application 110 may receive input data 106 from database 104, where database application 110 is configured to communicate with database 104 using at least one of a variety of different database schemas 111. In some cases, input data 106 may include a sequence of tables with one or more rows of information in each table. In such cases, ORM mapping metadata 107 may indicate how to map a given row of a table to a certain class or object type. For instance, ORM metadata 107 may indicate that a certain row of information in a given table is to be mapped to a C++, Java, PHP or other class type, or that a different row is to be mapped to a workflow or other object type. Many other types of classes and objects can be used, and ORM metadata can be used to map to any of these various types. Input data 106 may also be received in other forms (other than in tabular form) and each portion of that data may be mapped independently to various class and object types, depending on the associated ORM metadata.

Method 200 includes an act of the generic database application inferring a portion of ORM metadata from the at least one database schema, the ORM metadata being associated with the received input data, the ORM metadata including an indication of database object properties and database schema settings associated with the database objects (act 220). For example, metadata inferring module 113 of database application 110 may infer ORM metadata 107 which is associated with input data 106. ORM metadata 107 may include an indication of database object 105 properties and database schema settings associated with the database objects. Schema settings may indicate various schema properties that are configurable for each schema. Thus, schemas may operate differently, based on associated schema settings. In some cases, these schema settings may be dynamically updatable. In such cases, because the schema settings affect how data objects 105 are presented in ORM object view 125, when the schema settings have been updated, object view 125 may no longer be valid.

Accordingly, when schema settings are updated or when input data has changed, object views that were generated using those schema settings may be invalidated. Query evaluator 123 may perform the invalidation upon evaluating ORM query 112 and mapping information 116 and determining that one or more portions has changed. In some cases, invalidating the object view includes adding or removing an object from a workflow hierarchy 126, as illustrated in object view 125. In other cases, one or more columns of a table corresponding to input data being represented on the object view may be added or removed. In such cases, the portion removed may be removed without affecting the other objects being displayed in the ORM view.

Moreover, it should be noted that when (displayed) data portions are removed, the data removal may occur automatically and without any user intervention, and may occur without restarting generic database application 110. This can occur because the query evaluator tracks which aspects of ORM metadata were observed in the production of the object graph as the result of query evaluation. When the ORM metadata changes, query evaluator 123 is able to determine, based on the tracking, which aspects of the object graph are to be updated or invalidated. As such, in the above example, one or more corresponding columns of data objects may be added or removed automatically without any user intervention and dynamically without restarting the generic database application.

It should also be noted that queries issued against the object graph may similarly be tracked to determine which aspects of the object graph 122 were observed, thereby enabling identified queries to be invalidated or reevaluated. Moreover, when parsing object queries, an object query parser (e.g. query evaluator 123) may use queries over ORM metadata in its static type verification. Based on the evaluation of these queries over ORM metadata, evaluator 123 can determine which object queries need to be reparsed when ORM metadata and/or database schema information changes.

Method 200 includes an act of accessing a generic ORM query, the ORM query being configured to provide mapping information to map the input data into a graph of objects according to the database object properties included in the ORM metadata (act 230). For example, database application 110 may access generic ORM query 112. Generic ORM query 112 may be configured to provide mapping information 116 to map input data 106 into object graph 122 according to the database object properties associated with the database objects. As mentioned above, generic ORM query 112 may be configured to handle relational database schema changes without restarting or recompiling the generic database application. Such changes may be implemented dynamically because of the updated database object property settings and updated input data that are received and used to generate the object graph 122, which is, in turn, used to present an ORM object view to the user.

In some embodiments, any existing (or added) data dependencies in either or both of relational data (e.g. input data 106) or relational metadata (e.g. ORM metadata 107) may be tracked by the generic ORM query 112. In such cases, generic ORM query 112 may determine that either a portion of input data 106 currently being represented in an object view 125 or a portion of ORM metadata has been updated, and, based on the determination, may automatically and dynamically update the existing object view representing the updated input data. This updating may include automatically adding or removing information from the object view 125 in real-time, without the database application author having to determine the relationship between relational data or metadata (changes) and the resulting object graph.

Returning to FIG. 2, method 200 also includes an act of mapping the input data into a graph of objects, as indicated in the accessed ORM query, using the database object properties included in the ORM metadata (act 240). For example, mapping module 120 may map input data 106 into information usable by object graph generator 121 to generate object graph 122 as indicated by mappings 116 in ORM query 115, and further using the database object 105 properties included in ORM metadata 107. Object graph 122 may include input data 106 along with other mapping and display information usable by a user interface to display ORM object view 125. As indicated above, in some cases, the data may be displayed in a hierarchical fashion 126 as illustrated in FIG. 1. As further indicated above, many other types of information display types may be used.

Figure 3:
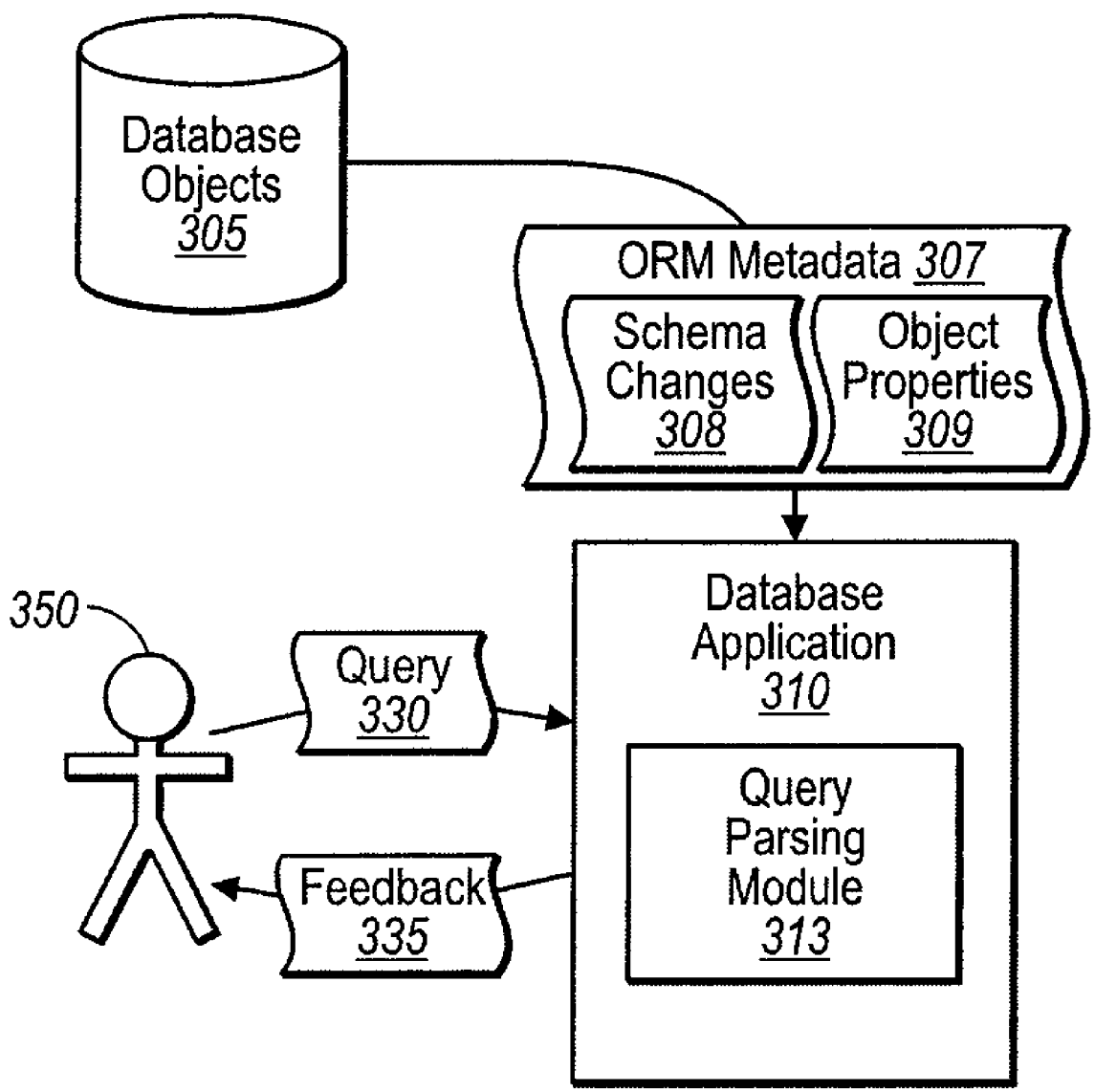
FIG. 3 illustrates a computer architecture in which embodiments of the present invention may operate including providing dynamic strongly-typed object querying in a database software application

Method 200 includes an act of displaying an ORM object view which includes the graph of objects, the object view representing at least a portion of the input data in an appropriate manner as indicated in the received ORM metadata (act 250). For example, ORM object view 125 may be displayed in an application's user interface, where the object view represents at least a portion of input data 106 in the manner indicated in ORM metadata 107. Accordingly, database data may be displayed as objects in an object view (e.g. 125). Moreover, the information represented in the objects may be updated, along with the associated schema settings, in real-time. The ORM object view displaying those objects may be correspondingly updated automatically in real-time, as the data and/or schema settings are being changed. In another embodiment, a user may receive real-time feedback regarding an entered query, as will be explained below with regard to environment 300 of FIG. 3 and method 400 of FIG. 4.

FIG. 4 illustrates a flowchart of a method 400 for providing dynamic strongly-typed object querying in a database software application. The method 400 will now be described with frequent reference to the components and data of environment 300 of FIG. 3. It should be noted that some elements of FIG. 3 may be similar to or the same as elements in FIG. 1. For example, ORM metadata 307 may be similar to or the same as ORM metadata 107.

Method 400 includes an act of a database software application receiving a query from a user, wherein the database software application is configured to identify relational database schema changes as provided in portions of object-relational mapping (ORM) metadata (act 410). For example, database application 310 may receive query 330 from user 350. The query may request portions of information from database 104 stored as database objects 105.

In some embodiments, database application 310 may comprise a generic, database-browsing application that is configured to connect to and communicate with one or more other databases. At least in some cases, this connection and communication can occur with no specific knowledge of the other database's schema. Strong-typing functionality and dependency tracking functionality may be implemented by the generic database-browsing application in communications with the second database. As used herein, strong-typing functionality may refer to functionality that checks to ensure that given input or portion of data is of the correct type. Moreover, strongly-typed querying refers to treating queries over the object view with static, parse-time type-checking. In some cases, this may be the same style of static type-checking that non-generic database applications implement when they use ORM compile-time tools to compile "object class types" and then compile the object queries in the database application against the "object class types".

For example, in a strongly-typed system, an integer input would be rejected if the required input was a string. Dependency tracking functionality, as used herein, refers to an ability to track data and/or schema dependencies between different portions of data stored in a database. As explained above, ORM metadata may be used in tracking dependencies for data that is to be displayed in an object view.

Method 400 includes an act of the database software application receiving one or more portions of (ORM) metadata associated with the database object, the ORM metadata including an indication of object properties and database schema changes associated with the database object (act 420). For example, database application 310 may receive ORM metadata 307 which is associated with one or more database objects 305. The ORM metadata 307 includes an indication of object properties 309 and database schema changes 308 associated with the one or more database objects that were requested in query 330. In some cases, user 350 may be able to select various object property values as part of the query. Accordingly, the user may be able to identify different object property values from property values that are being mapped into the object graph.

Method 400 includes an act of the database software application dynamically parsing the received query to perform type-checking on the query (act 430). For example, query parsing module 313 of database application 310 may dynamically parse received query 330 to perform type-checking on the query as the query is received. Accordingly, at least in some embodiments, the type-checking may occur as the query is being typed or immediately after a word or a portion of a word or search string has been entered. In other cases, the dynamic parsing may occur prior to runtime and prior to generating a object query (e.g. query 115) for evaluation and eventual conversion to an object graph. Dynamic parsing may include transforming the received query 330 into an appropriate form that a query evaluator is configured to evaluate. A query evaluator may be configured to perform type-checking on a query dynamically as the query is entered.

In some cases, query 330 may be issued against a previously-generated object view. Accordingly, user 350 may view various objects being displayed in ORM object view 125 and enter a query against those objects represented in the previously-generated object view. Thus, queries may be issued indirectly against data objects 105/305 and/or directly against displayed objects 126 in ORM object view 125.

Method 400 also includes, based on the dynamic parsing, an act of providing substantially instantaneous feedback regarding the compatibility of the received query (act 440). For example, based on the results of the dynamic parsing performed by module 313, database application 310 may provide substantially instantaneous feedback (e.g. feedback 335) regarding the type compatibility of received query 330. Thus, user 350 may know as the user is entering the database query whether the query is of the appropriate type. The query evaluator may provide feedback based on what the database objects' corresponding ORM metadata listed as possible properties for a given object.

Accordingly, at least in some embodiments, ORM and strong-typing functionality may be extended to a generic database application. Moreover, a user may receive substantially instantaneous feedback regarding the propriety and/or compatibility of an inputted database query without having to wait until runtime to discover potential type or class errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing network at which data is made available from a variety of different sources and in a variety of different data types and formats, a computer-implemented method for use at a computer system having a processor and memory, and which is running a database application configured to communicate with a database using at least one of a variety of different database schemas, the computer-implemented method facilitating the ability of the database application to more easily use the data from the variety of different sources, and comprising:

receiving at the database application input data from a database;

instantiating at the database application a metadata inferring module that infers object relational mapping (ORM) metadata for one or more database objects of the received input data, the ORM metadata inferred from at least one of the database schemas that the database application is configured to use, the inferred ORM metadata including an indication of database object properties and database schema settings associated with one or more database objects of the received input data, thereby allowing the database application to implement ORM capabilities to retrieve and access information from the database;

instantiating at the database application an object relational mapping (ORM) query module configured to use ORM metadata to generate information that is used to generate an object graph, the ORM query module processing the ORM metadata for the one or more database objects of the received input data;

instantiating an object graph generator and, using the information derived by the ORM query module after processing the ORM metadata, the object graph generator then mapping the one or more database objects of the input data into a graph of objects which enables the mapped one or more database objects to be sent to another application or to be subsequently displayed in an ORM object view.

2. The method of claim 1, wherein the ORM query module is configured to handle relational schema changes without restarting or recompiling the database application.

3. The method of claim 1, wherein the input data received from the database includes a sequence of tables with one or more rows of information in each table.

4. The method of claim 3, wherein the ORM metadata indicates how to map a given row of a table to a certain class or object type.

5. The method of claim 1, further comprising an act of tracking one or more input data dependencies in the ORM query module.

6. The method of claim 1, further comprising:

an act of determining that at least a portion of input data being displayed in an ORM object view has been updated; and an act of automatically and dynamically updating the existing object view based on the updated input data.

7. The method of claim 6, wherein the updates to the input data are tracked using the ORM query module.

8. The method of claim 1, further comprising:

an act of determining that at least a portion of schema settings in the database have been updated; and an act of invalidating a displayed ORM object view based on the determination that schema settings in the database have been updated.

9. The method of claim 8, wherein invalidating the displayed ORM object view comprises adding or removing one or more columns of a table corresponding to the input data being represented on the displayed ORM object view.

10. The method of claim 9, wherein the one or more corresponding columns is added or removed automatically without any user intervention and dynamically without restarting the database application.

11. In a computing network at which data is made available from a variety of different sources and in a variety of different data types and formats, a physical storage media having stored thereon computer-executable instructions for implementing a method for use at a computer system having a processor and memory, and which is running a database application configured to communicate with a database using at least one of a variety of different database schemas, the computer-implemented method facilitating the ability of the database application to more easily use the data from the variety of different sources, and comprising:

receiving at the database application input data from a database;

instantiating at the database application a metadata inferring module that infers object relational mapping (ORM) metadata for one or more database objects of the received input data, the ORM metadata inferred from at least one of the database schemas that the database application is configured to use, the inferred ORM metadata including an indication of database object properties and database schema settings associated with one or more database objects of the received input data, thereby allowing the database application to implement ORM capabilities to retrieve and access information from the database;

instantiating at the database application an object relational mapping (ORM) query module configured to use ORM metadata to generate information that is used to generate an object graph, the ORM query module processing the ORM metadata for the one or more database objects of the received input data;

instantiating an object graph generator and, using the information derived by the ORM query module after processing the ORM metadata, the object graph generator then mapping the one or more database objects of the input data into a graph of objects which enables the mapped one or more database objects to be sent to another application or to be subsequently displayed in an ORM object view.

12. The physical storage media of claim 11, wherein the ORM query module is configured to handle relational schema changes without restarting or recompiling the database application.

13. The physical storage media of claim 11, wherein the input data received from the database includes a sequence of tables with one or more rows of information in each table.

14. The physical storage media of claim 13, wherein the ORM metadata indicates how to map a given row of a table to a certain class or object type.

15. The physical storage media of claim 11, further comprising an act of tracking one or more input data dependencies in the ORM query module.

16. The physical storage media of claim 11, further comprising:

an act of determining that at least a portion of input data being displayed in an ORM object view has been updated; and an act of automatically and dynamically updating the existing object view based on the updated input data.

17. The physical storage media of claim 16, wherein the updates to the input data are tracked using the ORM query module.

18. The physical storage media of claim 11, further comprising:

an act of determining that at least a portion of schema settings in the database have been updated; and an act of invalidating a displayed ORM object view based on the determination that schema settings in the database have been updated.

19. The physical storage media of claim 18, wherein invalidating the displayed ORM object view comprises adding or removing one or more columns of a table corresponding to the input data being represented on the displayed ORM object view.

20. The physical storage media of claim 19, wherein the one or more corresponding columns is added or removed automatically without any user intervention and dynamically without restarting the database application.

* * * * *